United States Patent
Bissey

(10) Patent No.: US 11,822,489 B2
(45) Date of Patent: Nov. 21, 2023

(54) DATA INTEGRITY PROTECTION FOR RELOCATING DATA IN A MEMORY SYSTEM

(71) Applicant: Micron Technology, Inc., Boise, ID (US)

(72) Inventor: Lucien J. Bissey, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/231,308

(22) Filed: Dec. 21, 2018

(65) Prior Publication Data

US 2020/0201788 A1    Jun. 25, 2020

(51) Int. Cl.
| | |
|---|---|
| *G06F 12/00* | (2006.01) |
| *G06F 12/14* | (2006.01) |
| *G06F 3/06* | (2006.01) |
| *H04L 9/06* | (2006.01) |
| *G06F 21/60* | (2013.01) |

(52) U.S. Cl.
CPC ........ *G06F 12/1408* (2013.01); *G06F 3/0623* (2013.01); *G06F 3/0647* (2013.01); *G06F 3/0652* (2013.01); *G06F 3/0659* (2013.01); *G06F 3/0679* (2013.01); *G06F 21/602* (2013.01); *H04L 9/0643* (2013.01); *G06F 2212/1052* (2013.01); *G06F 2212/2022* (2013.01)

(58) Field of Classification Search
CPC .... G06F 3/0623; G06F 3/0647; G06F 3/0652; G06F 3/0659; G06F 3/0679; G06F 12/1408; G06F 21/602; G06F 2212/1052; G06F 2212/2022; H04L 9/0643
See application file for complete search history.

(56) References Cited

U.S. PATENT DOCUMENTS

| | | | | |
|---|---|---|---|---|
| 5,937,066 A | * | 8/1999 | Gennaro | ............... H04L 9/0841 380/286 |
| 7,010,655 B1 | * | 3/2006 | Harmer | ................. G06F 12/023 707/999.008 |

(Continued)

OTHER PUBLICATIONS

Hash function, Wikipedia, printed on Dec. 20, 2018.

(Continued)

*Primary Examiner* — Craig S Goldschmidt
(74) *Attorney, Agent, or Firm* — Greenberg Traurig

(57) ABSTRACT

Methods, apparatuses, and systems related to data management and security in a memory device are described. Data may be stored in a memory system, and as part of an operation to move data from one region to another in the memory system, the data may be validated using one or more hash functions. For example, a memory device may compute a hash value of some stored data, and use the hash value to validate another version of that stored data in the process of writing the other version stored data to a region of the memory system. The memory device may store another hash that is generated from the hash of the stored data and a record of transactions such that transactions are identifiable; the sequence of transactions within the memory system may also be identifiable. Hashes of transactions may be stored throughout the memory system or among memory systems.

21 Claims, 5 Drawing Sheets

(56) References Cited

U.S. PATENT DOCUMENTS

| | | | | |
|---|---|---|---|---|
| 7,180,407 | B1* | 2/2007 | Guo | G07C 5/0891 |
| | | | | 348/148 |
| 9,678,968 | B1* | 6/2017 | Taylor | G06F 11/2089 |
| 9,753,802 | B1* | 9/2017 | Shipilov | G06F 11/1443 |
| 2009/0019246 | A1* | 1/2009 | Murase | G06F 3/0641 |
| | | | | 711/162 |
| 2011/0055471 | A1 | 3/2011 | Thatcher et al. | |
| 2012/0096217 | A1 | 4/2012 | Son et al. | |
| 2013/0326115 | A1 | 12/2013 | Goss et al. | |
| 2014/0215129 | A1 | 7/2014 | Kuzmin et al. | |
| 2015/0019797 | A1* | 1/2015 | Huang | G06F 3/0679 |
| | | | | 711/103 |
| 2016/0099810 | A1 | 4/2016 | Li et al. | |
| 2016/0321654 | A1* | 11/2016 | Lesavich | G06F 16/9554 |
| 2017/0060936 | A1* | 3/2017 | Gammans | G06F 16/2358 |
| 2017/0255708 | A1* | 9/2017 | Cho | G06F 16/22 |
| 2018/0139278 | A1 | 5/2018 | Bathen et al. | |
| 2018/0204416 | A1* | 7/2018 | Perea-OcHoa | G07F 17/3272 |

OTHER PUBLICATIONS

Blockchain, Wikipedia, printed on Oct. 30, 2018.
International Search Report and Written Opinion, PCT/US2019/064986, dated Mar. 26, 2020.
Extended European Search Report, EP 19900898.8, dated Aug. 17, 2022.
Mielke, Neal R., et al., "Reliability of Solid-State Drives Based on NAND Flash Memory." Proceedings of the IEEE, vol. 105 No. 9, IEEE, Aug. 1, 2017.

\* cited by examiner

DATA INTEGRITY PROTECTION FOR RELOCATING DATA IN A MEMORY SYSTEM

FIELD OF THE TECHNOLOGY

At least some embodiments disclosed herein relate to memory systems in general, and more particularly, but not limited to data integrity protection for relocating data in a memory system.

BACKGROUND

In general, a memory system can be a memory module, a storage device, or a hybrid memory/storage device. Examples of a memory module include a dual in-line memory module (DIMM), a small outline DIMM (SO-DIMM), or a non-volatile dual in-line memory module (NVDIMM). Examples of a storage device includes a solid-state drive (SSD), or a hard disk drive (HDD).

A host system can utilize a memory system to store data and/or instructions and to retrieve data and/or instructions. A memory system can include one or more memory components that can store data and/or instructions.

In general, memory components can be non-volatile or volatile. A volatile memory component requires power to maintain stored data. A non-volatile memory component can retain stored data even when not powered. Examples of memory components include memory integrated circuits. Some memory integrated circuits are volatile, such as Dynamic Random-Access Memory (DRAM) and Static Random-Access Memory (SRAM). Some memory integrated circuits are non-volatile, such as flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc.

A memory system may move content from one location to another. For example, a flash memory is typically organized in blocks and pages. A block of flash memory contains multiple pages of flash memory. Each page can be individually programmed to store data. However, before a page can be re-programmed to store different data, the page is to be erased; and the pages in the block are configured to be erased together. Instead of immediately erasing the entire block to re-program a page, a controller can mark the page as containing invalid data and use another page to store the data. A garbage collection operation is typically configured to reclaim the storage capacity of pages having invalid data. For example, during the garbage collection operation, the valid data in other pages in the block can be relocated such that the entire block can be erased to claim the storage capacity of the page(s) having invalid data.

BRIEF DESCRIPTION OF THE DRAWINGS

The embodiments are illustrated by way of example and not limitation in the figures of the accompanying drawings in which like references indicate similar elements.

DETAILED DESCRIPTION

Security vulnerabilities in a computer system may be exploited to alter data content during the operations of moving data from one memory location to another memory location. For example, during a garbage collection operation, the valid data retrieved from a source block of flash memory may be altered before writing into a destination block of flash memory. Writing the altered data into the destination block and erasing the source block can result in the loss of valid data initially stored in the source block. Further, the altered data content may contain malicious codes which when executed, can result in further data breach and/or security breach.

At least some aspects of the present disclosure are directed to techniques of securing data integrity during operations to move data from one memory location to another memory location.

For example, when data is written/programmed into a memory region, a transaction record can be generated to include a hash value (or "hash") of the data in the memory region. A cryptographic hash function can be applied to the data to generate the hash value. The cryptographic hash function can map the data to the hash value that has a predetermined size; and it is difficult to modify the data without changing its hash generated using the cryptographic hash function. Further, it is generally difficult to reconstruct the original data from its hash; and different data can be mapped to the same hash. When the data is to be moved from the memory region to a destination memory region, a controller is configured to validate the data to be written/programmed into the destination memory region based on the transaction record and/or the hash. When the data to be written/programmed into the destination memory region has been altered and thus is determined to be invalid based on the transaction record/hash, the operation to move the data can be stopped to prevent the loss of original data in the source memory region; and an alert or notification can be generated about possible security breach and/or data corruption in the memory system.

Figure 1:
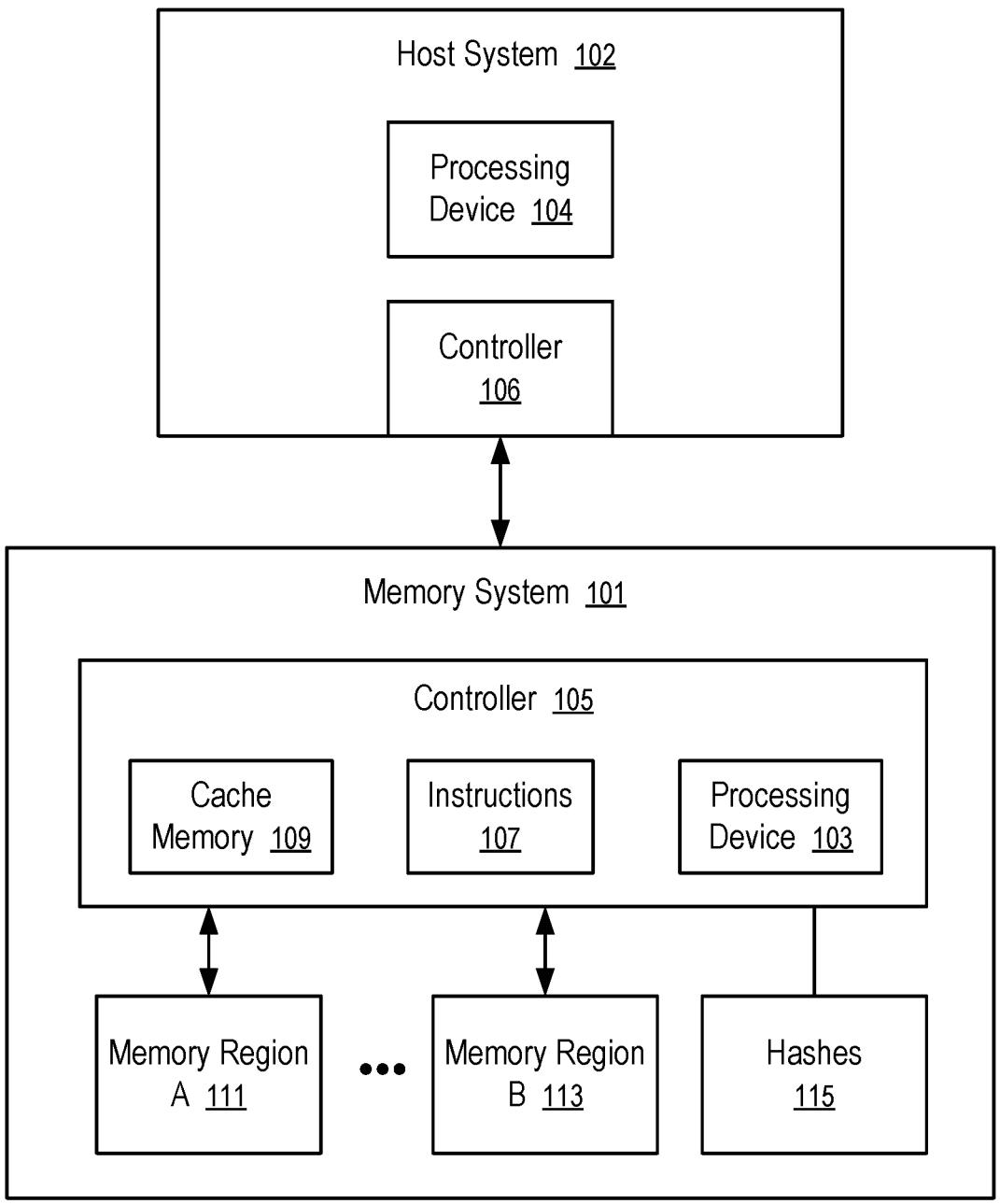
FIG. 1 illustrates an example computing system having a memory system in accordance with some embodiments of the present disclosure.

FIG. 1 illustrates an example computing system having a memory system (101) in accordance with some embodiments of the present disclosure. The memory system (101) can include media, such as memory regions (111, . . . , 113). The memory regions (111, . . . , 113) can be volatile memory regions, non-volatile memory regions, or a combination of such. In some embodiments, the memory system (101) is a memory module. Examples of a memory module includes a DIMM, NVDIMM, and NVDIMM-P. In some embodiments, the memory system (101) is a storage device. An example of a storage device is a solid-state drive (SSD). In some embodiments, the memory system (101) is a hybrid memory/storage sub-system. In general, the computing system can include a host system (102) that uses the memory system (101). For example, the host system (102) can write data to the memory system (101) and read data from the memory system (101).

The computing system and/or the host system (102) can be a computing device such as a desktop computer, laptop computer, network server, mobile device, or such computing device that includes a memory and a processing device. The host system (102) can include or be coupled to the memory system (101) so that the host system (102) can read data from or write data to the memory system (101). The host system (102) can be coupled to the memory system (101) via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system (102) and the memory system (101). The host system (102) can further utilize an NVM Express (NVMe) interface to access the memory regions (111, . . . , 113) when the memory system (101) is coupled with the host system (102) by the PCIe interface. The physical host interface can provide an interface for passing control, address, data, and other signals between the memory system (101) and the host system (102). FIG. 1 illustrates a memory system (101) as an example. In general, the host system (102) can access multiple memory systems via a same communication connection, multiple separate communication connections, and/or a combination of communication connections.

The host system (102) includes a processing device (104) and a controller (106). The processing device (104) of the host system (102) can be, for example, a microprocessor, a central processing unit (CPU), a processing core of a processor, an execution unit, etc. In some instances, the controller (106) can be referred to as a memory controller, a memory management unit, and/or an initiator. In one example, the controller (106) controls the communications over a bus coupled between the host system (102) and the memory system (101).

In general, the controller (106) can send commands or requests to the memory system (101) for desired access to memory regions (111) to (113). The controller (106) can further include interface circuitry to communicate with the memory system (101). The interface circuitry can convert responses received from memory system (101) into information for the host system (102).

The controller (106) of the host system (102) can communicate with a controller (105) of the memory system (101) to perform operations such as reading data, writing data, or erasing data at the memory regions (111, . . . , 113) and other such operations. In some instances, the controller (106) is integrated within the same package of the processing device (104). In other instances, the controller (106) is separate from the package of the processing device (104). The controller (106) and/or the processing device (104) can include hardware such as one or more integrated circuits and/or discrete components, a buffer memory, a cache memory, or a combination thereof. The controller (106) and/or the processing device (104) can be a microcontroller, special purpose logic circuitry (e.g., a field programmable gate array (FPGA), an application specific integrated circuit (ASIC), etc.), or another suitable processor.

The memory regions (111, . . . , 113) can include any combination of the different types of non-volatile memory regions and/or volatile memory regions. An example of non-volatile memory regions includes a Not-AND (NAND) type flash memory. Each of the memory regions (111) to (113) can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system (102). Although non-volatile memory regions such as NAND type flash memory are described, the memory regions (111, . . . , 113) can be based on any other type of memory such as a volatile memory. In some embodiments, the memory regions (111, . . . , 113) can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), Not-OR (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory regions (111, . . . , 113) can be grouped as memory pages or data blocks that can refer to a unit of the memory component used to store data.

The controller (105) of the memory system (101) can communicate with the memory regions (111, . . . , 113) to perform operations such as reading data, writing data, or erasing data at the memory regions (111) to (113) and other such operations (e.g., in response to commands scheduled on a command bus by controller (106)). The controller (105) can include hardware such as one or more integrated circuits and/or discrete components, a buffer memory, or a combination thereof. The controller (105) can be a microcontroller, special purpose logic circuitry (e.g., a field programmable gate array (FPGA), an application specific integrated circuit (ASIC), etc.), or another suitable processor. The controller (105) can include a processing device (103) (e.g., processor) configured to execute instructions (107). In the illustrated example, the cache memory (109) of the controller (105) includes an embedded memory configured to store instructions (107) for performing various processes, operations, logic flows, and routines that control operation of the memory system (101), including handling communications between the memory system (101) and the host system (102). In some embodiments, the cache memory (109) can include memory registers storing memory pointers, fetched data, etc. The controller (105) can also include read-only memory (ROM) for storing micro-code. While the example memory system (101) in FIG. 1 has been illustrated as including the controller (105), in another embodiment of the present disclosure, a memory system (101) may not include a controller (105), and can instead rely upon external control (e.g., provided by an external host, or by a processor or controller separate from the memory system).

In general, the controller (105) can receive commands or operations from the host system (102) and can convert the commands or operations into instructions (107) or appropriate commands to achieve the desired access to the memory regions (111, ..., 113). The controller (105) can be responsible for other operations such as wear leveling operations, garbage collection operations, error detection and error-correcting code (ECC) operations, encryption operations, caching operations, and address translations between a logical block address and a physical block address that are associated with the memory regions (111, ..., 113). The controller (105) can further include host interface circuitry to communicate with the host system (102) via the physical host interface. The host interface circuitry can convert the commands received from the host system into command instructions (107) to access the memory regions (111, ..., 113) as well as convert responses associated with the memory regions (111, ..., 113) into information for the host system (102).

The memory system (101) can also include additional circuitry or components that are not illustrated. In some embodiments, the memory system (101) can include a cache or buffer (e.g., DRAM) and address circuitry (e.g., a row decoder and a column decoder) that can receive an address from the controller (105) and decode the address to access the memory regions (111, ..., 113).

The memory system (101) of FIG. 1 stores hashes (115) of data stored in the memory regions. When the controller (105) moves data from a source memory region (e.g., 111) to a destination memory region (e.g., 113) (e.g., in a garbage collection operation, or in response to a command from the host system (102)), the memory system (101) is configured to validate the data to be written into the destination memory region (e.g., 113), before erasing the corresponding data in the source memory region (e.g., 111).

For example, when the memory system (101) of FIG. 1 programs/writes a page to store a data set, the memory system (101) can generate a transaction record of the transaction of programming the page. The transaction record can include a hash of the data set that can be used to validate a data set retrieved from the page. The transaction record can further include other information, such as the timestamp of the program/write operation, an identify of a program responsible for initiating the program/write operation, an identifier of the page, and/or a user account responsible for the program/write operation, etc.

To further enhance data security, the transaction record can be linked, via cryptographic hashes (e.g., via storing in a blockchain ledger), to a prior transaction record by including a hash of the transaction record of prior operation of programming the page or another page. For enhanced security, the transaction records can be stored in a plurality of locations in the computer system and/or the memory system (101), such that a data set can be validated against a majority of the transaction records.

Thus, the techniques in the present disclosure improve the reliability and integrity of data in the memory system (101).

Figure 2:
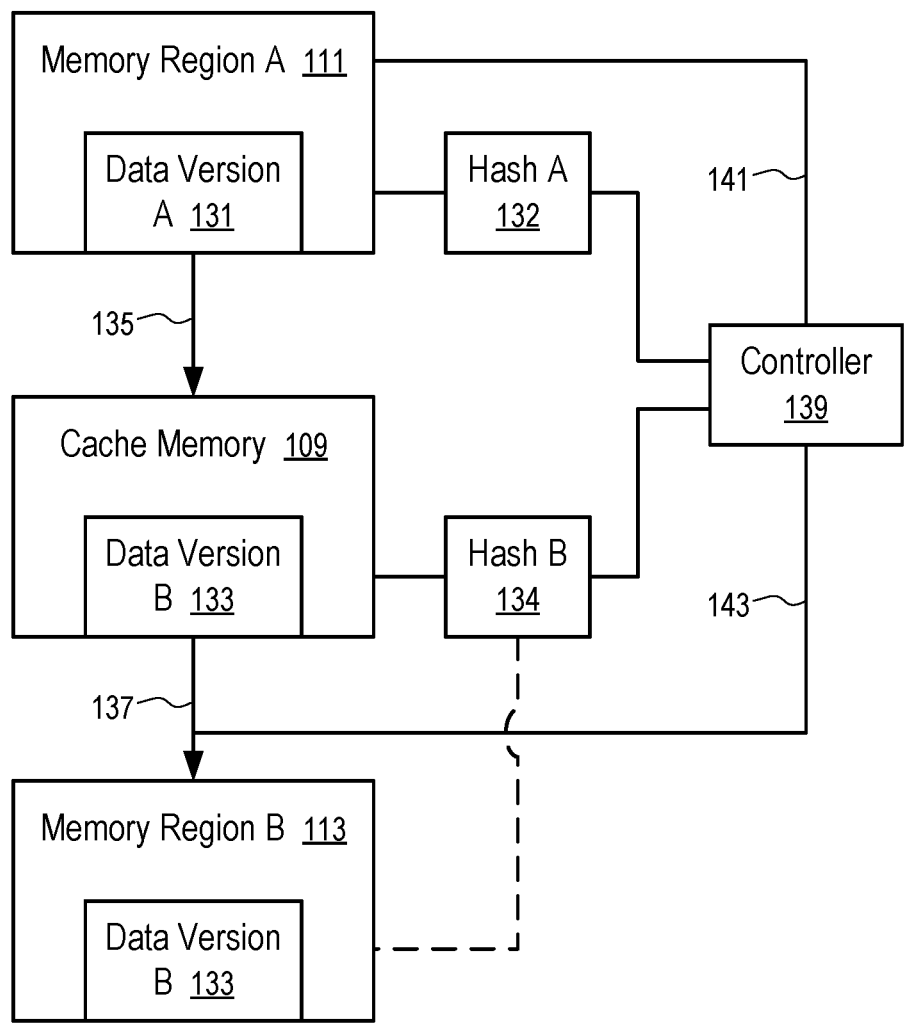
FIG. 2 shows a controller configured to protect data integrity in relocating data in a memory system.

FIG. 2 shows a controller (139) configured to protect data integrity in relocating data in a memory system, such as a memory system (101) of FIG. 1.

In FIG. 2, a source memory region (111) stores data version A (131). To move the data from the source memory region (111) into a destination memory region (113), the data is initially retrieved (135) from the source memory region (111) and then organized in a cache memory (109).

In general, data version B (133) in the cache memory (109) can be different from the data version A (131) in the source memory region (111).

For example, while the data is being organized in the cache memory (109), the data may be altered through a malicious attack exploring the security vulnerability in the instructions (107) of the memory system (101).

In some instances, the data movement can be initiated by a malicious program without even actually retrieving the data version A (131) from the source memory region (111).

In FIG. 2, the controller (139) is configured to be in control of finalizing the data move. For example, the controller (139) can be part of the controller (105) of the memory system of FIG. 1. In some instances, the controller (139) can be implemented at least in part via a set of instructions (107).

The controller (139) of FIG. 2 is configured to finalize the data move by at least erasing the data version A (131) in the source memory region (111). Before erasing the data version A (131) from the source memory region (111), the controller (139) verifies the validity of the data version B (133) in the cache memory (109) and/or in the destination memory region (113).

For example, the controller (139) is configured to be in control of writing data into a memory region. During the process of writing the data in the memory region, the controller (139) computes a hash of the data being written/programmed into the memory region. The hash can be stored as a transaction record of the write operation.

During the process of writing (137) the data version B (133) into the destination memory version (113), the controller (139) computes the hash (134) of the data version B (133). Before erasing (141) the data version A (131) from the source memory region (111), the controller (139) compares the hash (134) to the hash (132) of the data version A (131) for the validation of the data version B (133). If the validation is successful, the controller (139) erases (141) the data version (131) from the source memory region (111) to finalize the data move. Otherwise, the controller (139) can abort the data move, generate an alert, and/or re-start the data move.

In some implementations, the hash (134) of the data version B (133) is computed before the data version B (133) is written/programmed (137) into the destination memory region (113). Thus, if the validation made by comparing the hashes (132 and 134) is not successful, the controller (139) can prevent (143) the writing of the data version B (133) into the destination memory region (113).

In some implementations, after the successful validation and before the completion of writing the data version B (133) into the destination memory region (113), the cache memory (109) is configured locked to prevent changes. After the completion of writing the data version B (133), the cache memory (109) can be unlocked for further operations.

In some implementations, the hash (134) of the data version B (133) is computed by reading the data version B (133) back from the destination memory region (113) and compared to the hash (132) of the data version A (131). Thus, errors occurring during the write/program operation can also be detected.

The hashes (132 and 134) can be stored as part of transaction records identifying the write operations of the data versions (131 and 133).

Preferably, the hashes (132 and 134) (and the transaction records) are stored separately from the data versions (131 and 133) and accessed independently from the data versions (131 and 133).

Optionally, the hashes (132 and 134) (and the transaction records) are stored in the respective memory regions (111 and 113).

Further, multiple copies of the hashes (132 and 134) (and the transaction records) can be stored in various memory regions (e.g., 111 and 113). The controller (139) can validate a data version (133) against a majority of the copies of the hashes (131 and 134) (and the transaction records). A distributed hash storage configuration can be used where copies of the hash (e.g., 132) can be stored in multiple locations, such as the block (151) storing the data from which the hash (e.g., 132) is computed, one or more blocks (e.g., 171) that does not store the data from which the hash (e.g., 132) is computed, and/or the cache memory (109).

Optionally, a memory system (101) can include multiple controllers that are similar to the controller (139). The controllers can operate in parallel. Each controller (e.g., 139) can maintain a set of hashes (e.g., 132, 134) of data stored in memory regions (e.g., 111, 113) and independently validate a data set using their copies of hashes (e.g., 132, 134). Thus, even when some of the controllers and/or their hashes are hacked or corrupted, the memory system (101) can still validate the integrity of data to be moved.

Figure 3:
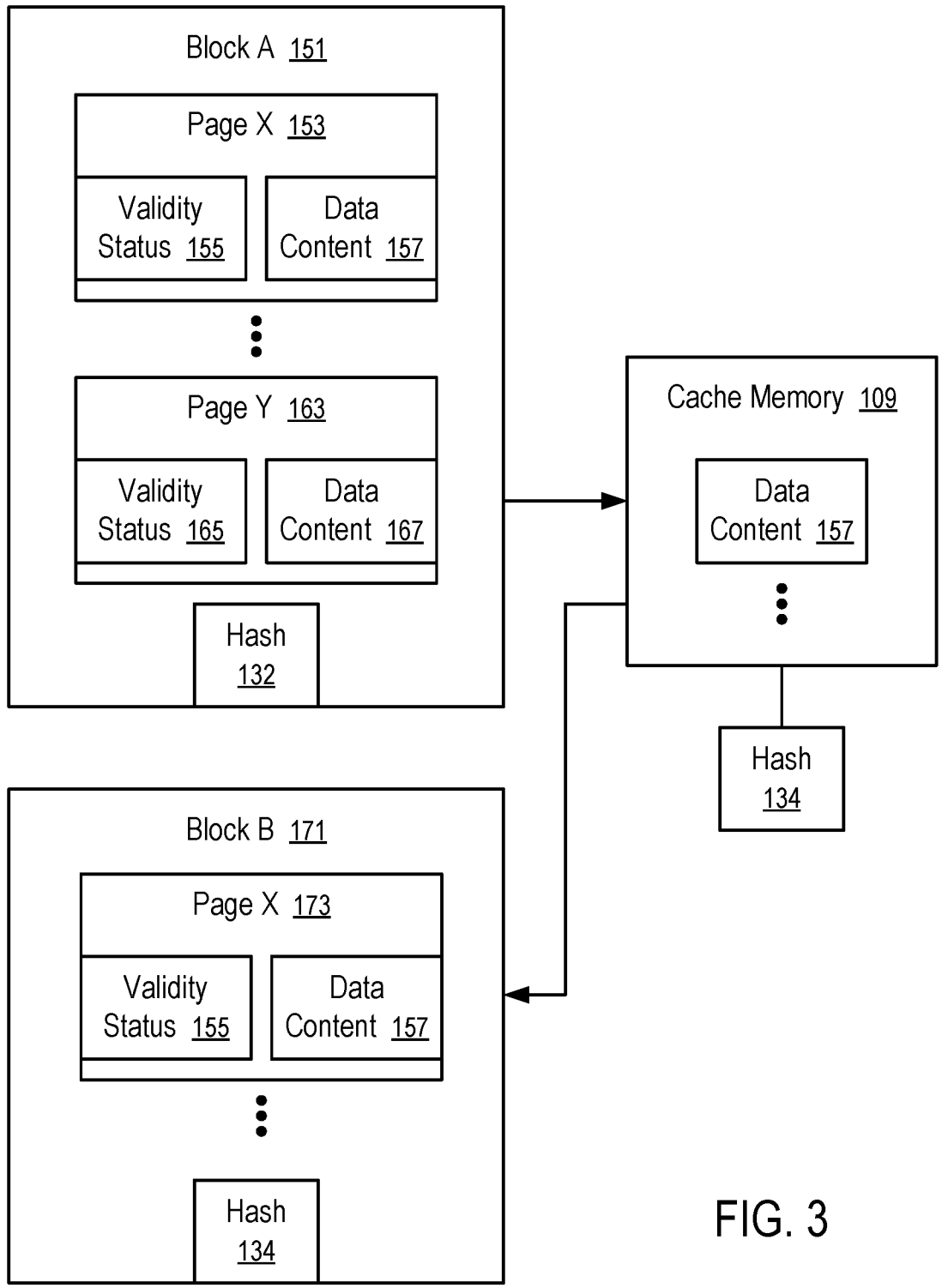
FIG. 3 illustrates a system to relocate data from one block to another.

FIG. 3 illustrates a system to relocate data from one block to another. For example, blocks (151 and 171) of FIG. 3 can be memory regions (111 and 113) of the memory system (101) illustrated in FIG. 1. For example, the blocks (151 and 171) can be flash memory configured in an SSD. For example, the system of FIG. 3 can be an application of the controller (139) of FIG. 2.

A source block (151) can contain multiple pages (153, ..., 163). Each of the pages (153, ..., 163) can be separately programmed when the block (151) is free and/or has been cleared via an erasure operation.

The source block (151) can store validity statuses (155, ..., 165) of the pages (153, ..., 163). For example, the content of the validity status (155) can indicate that the data content (157) in the page (153) is valid; and the content of the validity status (165) can indicate that the data content (167) in the page (163) is invalid.

A hash (132) of valid data (e.g., 157, ...) in the block (151) can be stored in the block (151) (and/or another location).

During a garbage collection operation, the valid data (e.g., 157, ...) is collected and/or organized in the cache memory (109) for writing into a destination block (171).

Before, during, and/or after, copying the data (e.g., 157, ...) from the cache memory (109) into the destination block (171), a controller (105 or 139) computes the hash (134) of the data (e.g., 157, ...).

If the hash (134) matches with the hash (132) of the valid data (e.g., 157, ...) in the source block (151) for the garbage collection operation, the garbage collection operation can complete, where the source block (151) can be erased after the completion of writing the data into the destination block (171).

If the hash (134) does not match with the hash (132) of the valid data (e.g., 157, ...) in the source block (151) for the garbage collection operation, the garbage collection operation is stopped; and the erasure of the source block (151) is prevented.

In some instances, the destination block (171) is entirely free of data before the valid data (e.g., 157, ...) in the cache memory (109) is written into the destination block (171). After the data move, the destination block (171) can store the hash (134) that is equal to the hash (132) of the valid data in the source block (151).

In other instances, the destination block (171) can have data in some pages before the valid data (e.g., 157, ...) in the cache memory (109) is written into the destination block (171). The valid data (e.g., 157, ...) can be written into free pages available in the destination block (171). After the data move, the block (171) stores a hash (134) of current valid data in the block (171), which is generally different from the hash (132) of the valid data in the source block (151).

Figure 4:
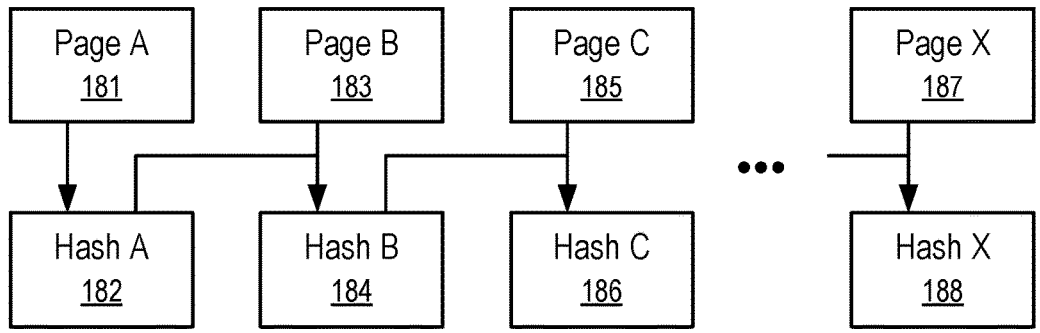
FIGS. 4-6 illustrate examples of constructing hashes to protect data integrity in relocating data in a memory system.
Figure 5:
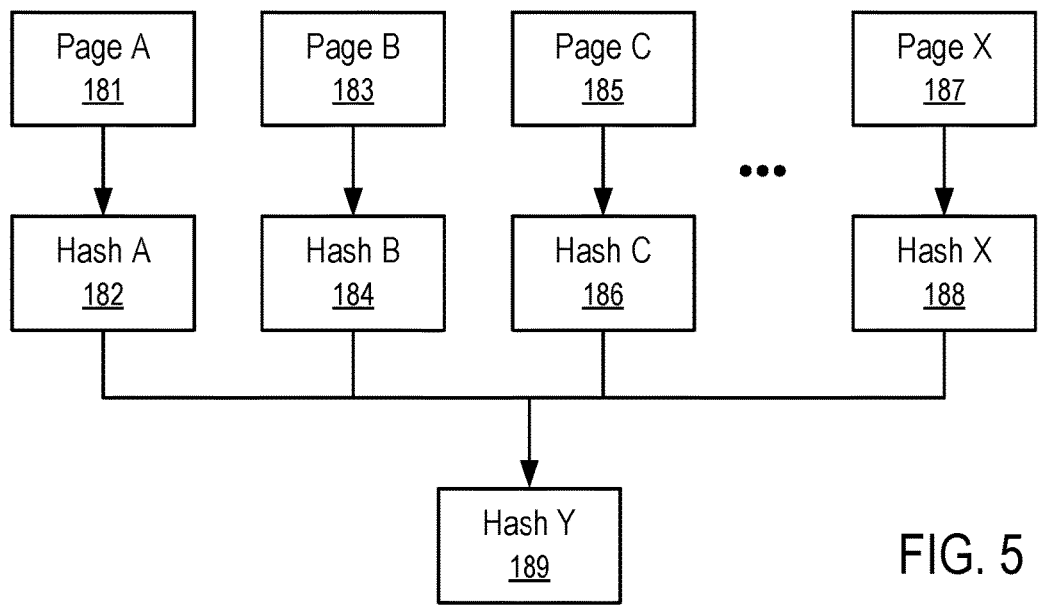
Figure 6:
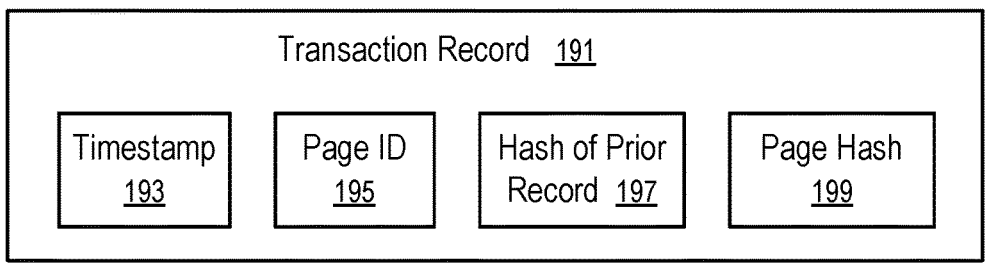

FIGS. 4-6 illustrate examples of constructing hashes to protect data integrity in relocating data in a memory system.

FIG. 4 illustrates a scenario where the hash (186) of a set of pages (181, 183, 185, ..., 187) written into a block (e.g., 151) is computed from a chain of hashes.

For example, after an initial page (181) is written into the block (151), a hash (182) is generated from the page (181). When a subsequent page (183) is written into the block (151), a subsequent hash (184) is computed from the hash (182) of the prior page (181) and the content of the subsequent page (183). Similarly, when a further page (185) is written into the block (151), a further hash (186) is computed from the hash (184) of the prior page (183) and the content of the further page (185). Thus, when the last page (187) is written into the block (151), the last hash (188) is dependent on the content of all of the pages (181, 183, 185, ..., 187). Validating against the last hash (188) can be used to validate the content of the entire set of pages (181, 183, 185, ..., 187).

FIG. 5 illustrates a scenario where the hash (189) of a set of pages (181, 183, 185, ..., 187) written into a block (e.g., 151) is computed directly from the hashes (182, 184, 186, ..., 188) of the respective pages (181, 183, 185, ..., 187). When one of the pages (e.g., 183) is marked invalid, the corresponding hash (e.g., 184) of the invalid page (e.g., 183) can be excluded from the computing of the hash for the remaining valid pages (e.g., 181, 183, 185, ..., 187). Thus, the hash (189) of the entire set of valid pages can be efficiently updated after one or more pages become invalid.

FIG. 6 illustrates a transaction record (191) to store the hash (199) of a page identified by a page ID (195). Optionally, the transaction record (191) can include a time stamp (193), a hash (191) of a prior transaction record, and/or other information, such as the identity of a host system (102), a user, or a program responsible for the page identified by the page ID (195), whether the page identified as the page ID is marked as being invalid, an address used by the host system (102) to access the page identified by the page ID (195), etc.

In general, the transaction record (191) of FIG. 6 and/or copies of it can be stored in the memory system (101) and/or other memory systems that are connected to the memory system (101).

For example, transaction records (e.g., 191) for pages (e.g., 153, ..., 163) of a block (e.g., 151) can be stored in the block (151).

Further, copies of the transaction records (e.g., 191) for pages (e.g., 153, ..., 163) of the block (e.g., 151) can be stored in one or more other selected blocks (e.g., 171).

For example, multiple controllers (e.g., 139) can configured to be in control of multiple sets of blocks. Each controller (139) is a master of a set of blocks (e.g., 151). A first controller (139) can provide transaction records (e.g., 191) in blocks controlled by the first controller (139) to one or more second controllers that are not the master of the blocks of the first controller (139). The one or more second controllers can store copies of the transaction records (e.g., 191) received from the first controller (139) and store the records in blocks under the control of the second controllers. During the validation process in the first controller (139), the second controllers can provide copies of the transaction records (or the relevant information from the copies) to validate the transaction records (e.g., 191) used by the first controller (139) in validating a page or block.

The transaction records (e.g., 191) can be used validate the data cached in the cache memory (109) not only for moving data within the memory system (101), but also for servicing the data for other purposes, such as transmitting the data to the host system (102) or to another memory system connected to the memory system (101).

Optionally, the transaction records (e.g., 191) can also be used to check the authorization to access data in the memory system. For example, when the transaction record (e.g., 191) includes ownership information (e.g., the host system, the user, the account, and/or the program responsible for writing the data in a page (153)), the ownership information can be checked against a data access request to determine whether the request is to be accepted or rejected. For example, the data access request can be a request to trim or erase the page, a request to read the page, a request to modify the page, etc.

In some instances, the controllers implement a blockchain ledger for transaction records of writing data into the memory system (101); and the transaction records (e.g., 191) can be recorded in the blockchain ledger with redundant copies and cryptographic chaining of records.

Figure 7:
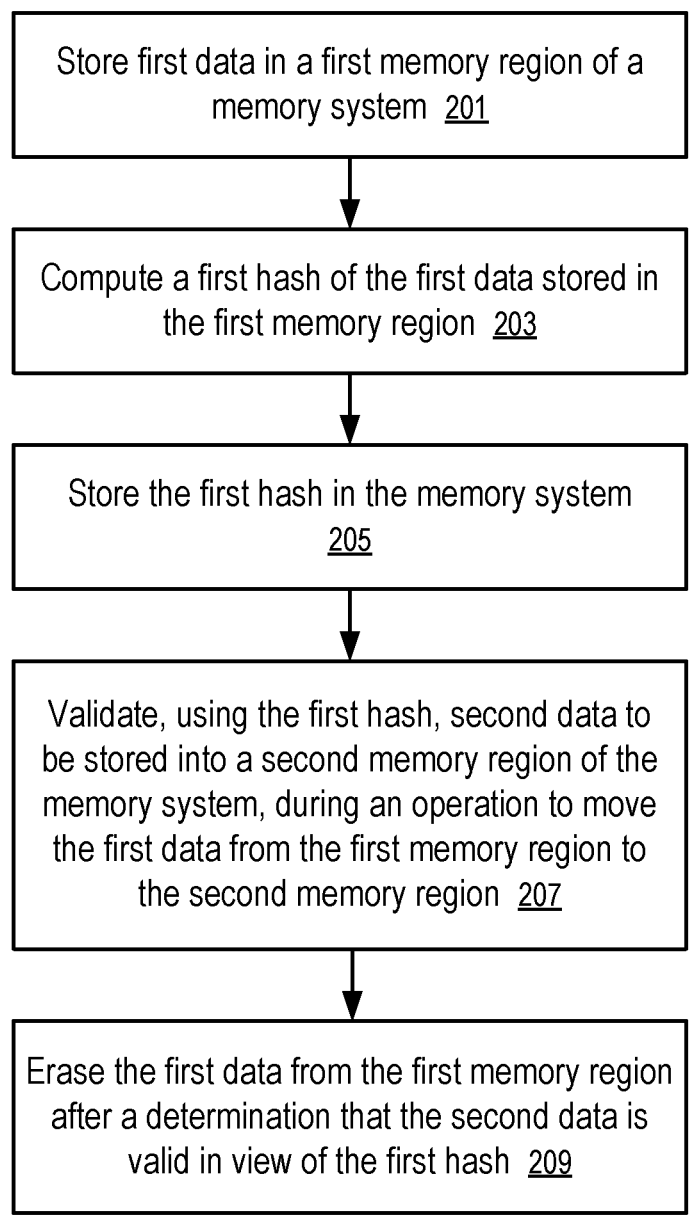
FIG. 7 shows a method of protecting data integrity in relocating data.

FIG. 7 shows a method of protecting data integrity in relocating data. For example, the method of FIG. 7 can be implemented in a computer system of FIG. 1, for a data relocation operation illustrated in FIG. 2 or 3, using hashes constructed according to FIG. 4 or 5. The hashes can be stored in a transaction record (191) illustrated in FIG. 6.

At block 201, a memory system (101) stores first data (131, or 157, . . . ) in a first memory region (111 or 151) of the memory system (101).

At block 203, a controller (105 or 139) computes a first hash (132) of the first data (131, or 157, . . . ) stored in the first memory region (111 or 151).

At block 205, the memory system (101) and/or the controller (105 or 139) stores the first hash (132) in the memory system (101).

At block 207, the controller (105 or 139) validates, using the first hash (132), second data (133, or 157, . . . ) to be stored into a second memory region (113 or 171) of the memory system (101), during an operation to move the first data (131, or 157, . . . ) from the first memory region (111 or 151) to the second memory region (113 or 171).

At block 209, the controller (105 or 139) erases the first data (131, or 157, . . . ) from the first memory region (111 or 151) after a determination that the second data (133, or 157, . . . ) is valid in view of the first hash (132).

For example, the first memory region (111) can be a first block (151) of flash memory of a solid state drive; the second memory region (113) can be a second block (171) of the flash memory of the solid state drive; and the operation is a garbage collection operation to erase the first block (151) of flash memory after the second data (133, or 157, . . . ) is stored in the second block (171). For example, the first block (151) of flash memory can have one or more first pages (e.g., 153, . . . ) storing the first data (e.g., 157, . . . ) and one or more second pages (e.g., 163) that have invalid data. The garbage collection operation erases the first block (151) of flash memory to at least claim a storage capacity corresponding to the one or more second pages (e.g., 163) that have invalid data.

For example, a solid state drive can have a cache memory (109) configured to buffer the second data (133, or 157, . . . ) that is typically a version of the first data (131, or 157, . . . ) retrieved from the first memory region (111 or 151). The controller (105 or 139) is configured to generate a second hash (134) of the second data (133, or 157, . . . ) and compare the second hash (134) to the first hash (132) to validate the second data (133, or 157, . . . ).

Optionally, the controller (105 or 139) can be configured to generate the second hash (134) during writing the second data into the second memory region (113 or 171). Upon completion of writing the second data (133, or 157, . . . ) into the second memory region (113 or 171), the controller (105 or 139) can determine whether the second data as being written into the second memory region (113 or 171) is valid.

Optionally, or in combination, the controller (105 or 139) can be configured to generate the second hash (134) based on the second data (133, or 157, . . . ) stored in the cache memory (109) before starting to copy the second data (133, or 157, . . . ) into the second memory region (113 or 171). Upon validation of the data in the cache memory (109), the controller (105 or 139) locks the cache memory (109) from changes until the completion of copying the second data (133, or 157, . . . ) from the cache memory (109) to the second memory region (113 or 171). Such an arrangement can prevent the copying of the data from the cache memory (109) to the second memory region (113 or 171) if the data in the cache memory (109) is invalidated via the first hash (132).

Optionally, or in combination, the controller (105 or 139) can be configured to generate the second hash (134) based on the second data (133, or 157, . . . ) stored in the second memory region (113 or 171) after the second data (133, or 157, . . . ) has been copied from the cache memory (109) into the second memory region (113 or 171).

Optionally, the first hash (132) can be stored in a transaction record (191) of writing the first data (131, or 157, . . . ) into the first memory region (111 or 151). The transaction record (191) can include a hash (197) of a prior transaction record for a prior operation of writing data into the first memory region (111 or 151), before the writing of the first data (131, or 157, . . . ) into the first memory region (111 or 151). Optionally, the transaction record (191) is stored in the first memory region (111 or 151); and one or more additional copies of the transaction record (191) can be stored in other locations the memory system (101). Validating the data in the cache memory (109) can be performed using the transaction record (191) stored in the first memory region (111 or 151) and/or the one or more additional copies stored in other locations in the memory system (101).

The controller (105 or 139) can be configured to be in control of the finalization of data moves within the memory system (101). During the finalization of a data move, the controller (105 or 139) is configured to erase the first data (131, or 157, . . . ) from the first memory region (111 or 151) only after a determination that the second data (133, or 157, . . . ) is valid in view of the first hash (132).

Optionally, the controller (105 or 139) can be further configured to be in control of the generation of a transaction record (191) of writing data into a memory region. The transaction record (191) can be stored in a blockchain implemented in the memory system (101).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory regions, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A solid state drive, comprising:
   a plurality of memory regions, including a first memory region and a second memory region; and
   a controller configured to generate, using a hash function, a first hash value of first data stored in the first memory region;
   wherein the controller is further configured to write the first hash value to a memory region of the plurality of memory regions, or to a cache, or both;
   wherein the controller is further configured to perform an operation to copy the first data from the first memory region to the second memory region as second data, wherein the second data is not fully located in the second memory region until the operation is completed;
   wherein the controller is further configured to validate, while the first data is being copied from the first memory region to the second memory region as the second data during the operation and using the first hash value, the first data being copied into the second memory region as the second data;
   wherein the controller is configured to erase the first data from the first memory region after a determination that the second data is valid in view of the first hash value;
   wherein the first memory region is a first block of flash memory of the solid state drive, the second memory region is a second block of flash memory of the solid state drive; and the operation erases the first block of flash memory after the second data is stored in the second block; and
   wherein the first block includes one or more first pages storing the first data and one or more second pages that have invalid data; and the operation erases the first block of flash memory to at least claim a storage capacity corresponding to the one or more second pages.

2. The solid state drive of claim 1, further comprising:
   a cache memory configured to store the second data;
   wherein the second data is a version of the first data retrieved from the first memory region.

3. The solid state drive of claim 2, wherein the controller is configured to generate a second hash value of the second data and compare the second hash value to the first hash value to validate the second data.

4. The solid state drive of claim 3, wherein the controller is configured to generate the second hash value during writing the second data into the second memory region.

5. The solid state drive of claim 3, wherein the controller is configured to generate the second hash value based on the second data stored in the cache memory and lock the cache memory from changes after the determination that the second data is valid in view of the first hash.

6. The solid state drive of claim 3, wherein the operation to copy the first data from the first memory region to the second memory region as the second data comprises copying the first data to the cache memory as the second data and then copying the second data from the cache memory to the second memory region, wherein the second hash is generated from the second data stored in the cache memory, and wherein the controller is configured to generate a third hash value based on the second data stored in the second memory region after the second data is copied into the second memory region from the cache memory.

7. A method, comprising:
storing first data in a first memory region of a memory system;
computing, using a first hash function, a first hash value of the first data stored in the first memory region;
storing the first hash value in the memory system;
performing an operation to copy the first data from the first memory region to second memory region of the memory system as second data, wherein the second data is not fully located in the second memory region until the operation is completed;
validating, while the first data is being copied from the first memory region to the second memory region as the second data during the operation and using the first hash function and the first hash value, the first data being copied to the second memory region as the second data;
erasing the first data from the first memory region based at least in part on validating the second data using the first hash value;
computing, using a second hash function, a second hash value by hashing a first transaction record associated with writing the first data into the first memory region, wherein the first transaction record includes the first hash value; and
generating a second transaction record associated with writing the first data into the first memory region, wherein the second transaction record comprises at least the second hash value.

8. The method of claim 7, further comprising:
storing third data in a memory region of the memory system;
computing, using the first hash function, a third hash value of the third data; and
generating a third transaction record of writing the third data into a third memory region, by including at least both the second hash value and the third hash value in the third transaction record.

9. The method of claim 7, further comprising:
storing one or more copies of the first transaction record in the memory system, wherein the validating is based at least in part on the one or more copies.

10. The method of claim 7, wherein the first transaction record further includes a time stamp of the writing the first data into the first memory region.

11. The method of claim 7, wherein the first memory region is a first block of flash memory in a solid state drive; the second memory region is a second block of flash memory in the solid state drive; and the operation includes a garbage collection operation in the solid state drive to erase the first block.

12. A memory system, comprising:
a first memory region configured to store first data and a second memory region;
a cache memory configured to store second data corresponding to a version of the first data stored in the first memory region; and
a controller configured to:
manage a first hash value of the first data stored in the first memory region; and
validate, using the first hash value, second data stored in the cache memory;
wherein the controller is further configured to move the first data from the first memory region to the second memory region based at least in part on validating the second data using the first hash value, wherein the second data is not fully located in the second memory region until the move of the first data from the first memory region to the second memory region is completed, and wherein the validating the second data stored in the cache memory by the controller occurs while the move of the first data from the first memory region to the second memory region is being completed by the controller.

13. The memory system of claim 12, wherein the controller is configured to erase the first data from the first memory region after a determination that the second data is valid in view of the first hash value.

14. The memory system of claim 12, wherein the controller is configured to generate a transaction record of writing data into the first memory region.

15. The memory system of claim 14, wherein the controller is configured to record the transaction record in a blockchain implemented in the memory system.

16. An apparatus, comprising:
a cache memory;
a plurality of memory regions, each memory region in the plurality of memory regions configured to store a data set; and
a controller configured to generate, using a cryptographical hash function, a hash value of the data set for a first memory region of the plurality of memory regions and store one or more copies of the hash value in the apparatus;
wherein after the data set is loaded from the first memory region into the cache memory, the controller is further configured to validate the data set in the cache memory using the one or more copies of the hash value;
wherein the controller is configured to, after the data set in the cache memory is validated, store a copy of the hash value in the first memory region and a copy of the hash value in a memory region other than the first memory region, wherein the copy of the hash value data is not located in the memory region other than the first memory region until after the data set is validated; and
wherein the controller is configured to write the data set from the cache memory to a second memory region while the data set in the cache memory is validated using the one or more copies of the hash value.

17. The apparatus of claim 16, wherein the controller is configured to erase the data set from the respective memory region to move the data set into a memory region other than the respective memory region, after a hash value, computed using the cryptographical hash function from the data set in the cache memory, agrees with the one or more copies.

18. A managed memory device having the apparatus of claim 16, wherein the controller is further configured to:
manage first hash values of data sets stored in the plurality of memory regions;
load a data set into the cache memory from a first memory region in the plurality of memory regions;
compute a second hash value using the data set from the cache memory; and determine whether the second hash value agrees with the first hash values managed by the controller.

19. The managed memory device of claim 18, wherein the controller is configured to compute the second hash value during writing the data set from the cache memory into a second memory region; and the controller is further configured to allow erasure of the data set from the first memory region to complete moving the data set from the first memory region to the second memory region, after a determination that the second hash value agrees with the first hash values managed by the controller.

20. The managed memory device of claim 18, wherein the controller is configured to allow writing the data set from the cache memory to the second memory region after a determination that the second hash value agrees with the first hash values managed by the controller; and the controller is further configured to lock the cache memory from changes during the writing of the data set from the cache memory to the second memory region.

21. The managed memory device of claim 18, wherein the controller is configured to allow a host system to read the data set from the cache memory after a determination that the second hash value agrees with the first hash values managed by the controller; and the controller is further configured to lock the cache memory from changes during the host system reading the data set from the cache memory.

* * * * *